United States Patent

Adams et al.

[11] Patent Number: 6,065,899
[45] Date of Patent: May 23, 2000

[54] STAKE SYSTEM

[75] Inventors: William E. Adams, Portersville; William E. Adams, IV, Zelienople, both of Pa.

[73] Assignee: Adam Mfg. Corp., Portersville, Pa.

[21] Appl. No.: 08/957,947

[22] Filed: Oct. 27, 1997

[51] Int. Cl.[7] .................................................. F21V 21/14
[52] U.S. Cl. ........................ 403/397; 403/399; 403/396; 248/74.2; 362/396; 362/252; 47/44; 47/47; 47/42
[58] Field of Search .................................. 47/44, 47, 42, 47/43, 45, 46; 362/123, 121, 806, 249, 252, 122, 396; 248/74.2, 316.7; 403/397, 398, 399, 396, 374.5, 374.2, 49, 170, 218

[56] References Cited

U.S. PATENT DOCUMENTS

| | | | |
|---|---|---|---|
| D. 376,756 | 12/1996 | Adams | D8/382 |
| 556,194 | 3/1896 | Meaher | 403/399 |
| 2,128,005 | 8/1938 | Lombard | 248/74.2 X |
| 2,751,174 | 6/1956 | Parker | 248/42 |
| 3,494,072 | 2/1970 | Olson | 47/44 |
| 3,541,322 | 11/1970 | Bennett | 362/121 |
| 3,704,367 | 11/1972 | Korb | 362/121 |
| 4,048,752 | 9/1977 | Anderson | 47/47 |
| 4,194,851 | 3/1980 | Littlefield | 403/218 |
| 4,677,788 | 7/1987 | Mastandrea | 47/47 |
| 4,942,693 | 7/1990 | Sibold | 47/44 |
| 4,956,757 | 9/1990 | Wang | 362/252 |
| 4,991,344 | 2/1991 | Carney | 47/47 X |
| 5,046,882 | 9/1991 | Ju | 403/170 |
| 5,060,961 | 10/1991 | Bontrager | 280/279 |
| 5,316,245 | 5/1994 | Ruckwardt | 248/74.2 X |
| 5,340,065 | 8/1994 | Thomas | 248/150 |
| 5,341,593 | 8/1994 | Foreman | 47/47 |
| 5,437,449 | 8/1995 | Zink | 273/32 B |
| 5,584,567 | 12/1996 | Rumpel | 362/249 |
| 5,609,415 | 3/1997 | Protz, Jr. | 362/396 |
| 5,667,174 | 9/1997 | Adams | 248/156 |
| 5,765,787 | 6/1998 | De Beers et al. | 248/74.2 X |
| 5,876,111 | 3/1999 | Wu | 362/252 X |

OTHER PUBLICATIONS

Adams Mfg. Product Sheet "Large Count Value Packs= Higher Retail Sales," Nov. 1994.

*Primary Examiner*—Lynne H. Browne
*Assistant Examiner*—David E. Bochna
*Attorney, Agent, or Firm*—Buchanan Ingersoll, P.C.

[57] ABSTRACT

A stake system has a set of couplings and fiberglass rods and can be expanded to include bendable wire and light holders which fit onto the rods. The connector has a tubular body open at opposite ends and a transverse inner wall or collar between the opposite ends which with the inner wall of the body defines an open upper cavity and an open lower cavity. Each cavity is sized to receive one end of a rod. A pair of arms extend outwardly from opposite edges of one end of the tubular housing. Each arm has a slotted opening of sufficient diameter to permit a cord of a decorative light string to be inserted into and pass through the opening. Elbows and rod holders are provided to have one end which fits into the coupling upper cavity and an opposite end that has a cavity or mouth sized to receive of a rod. This stake system allows a person of average mechanical ability to create lighted lawn ornaments in an almost infinite variety of shapes and sizes.

17 Claims, 5 Drawing Sheets

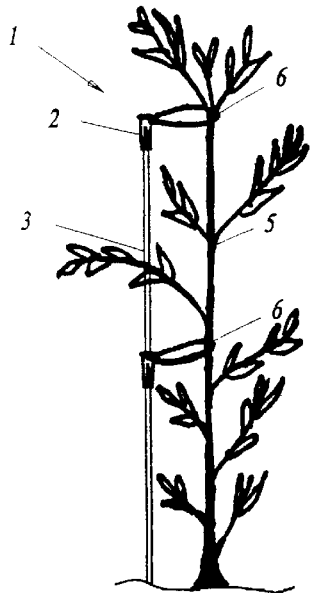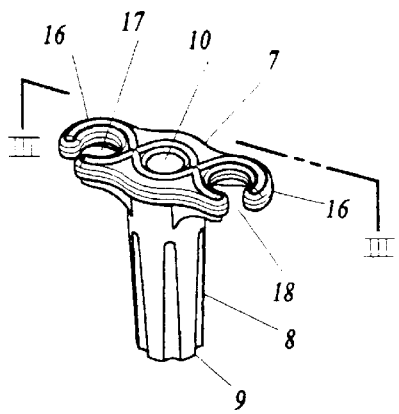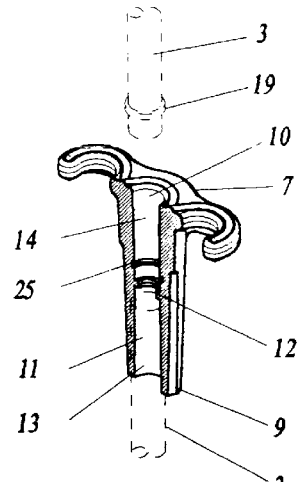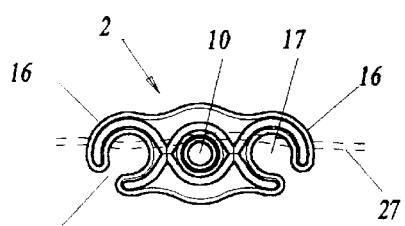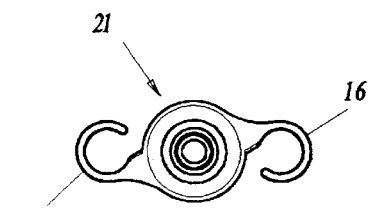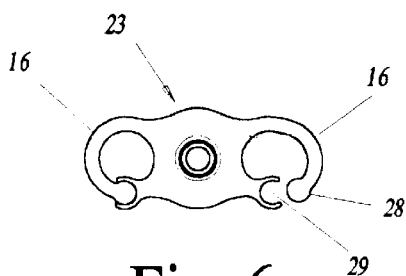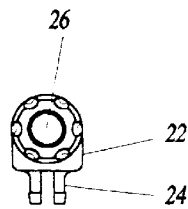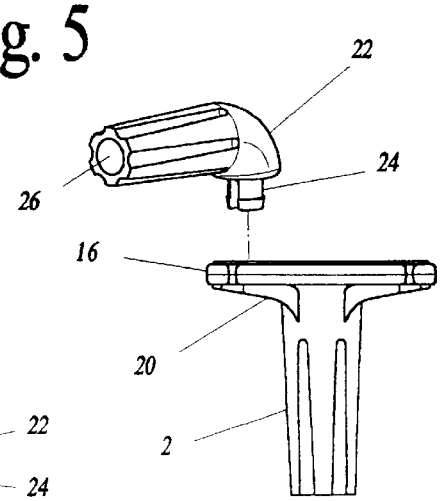

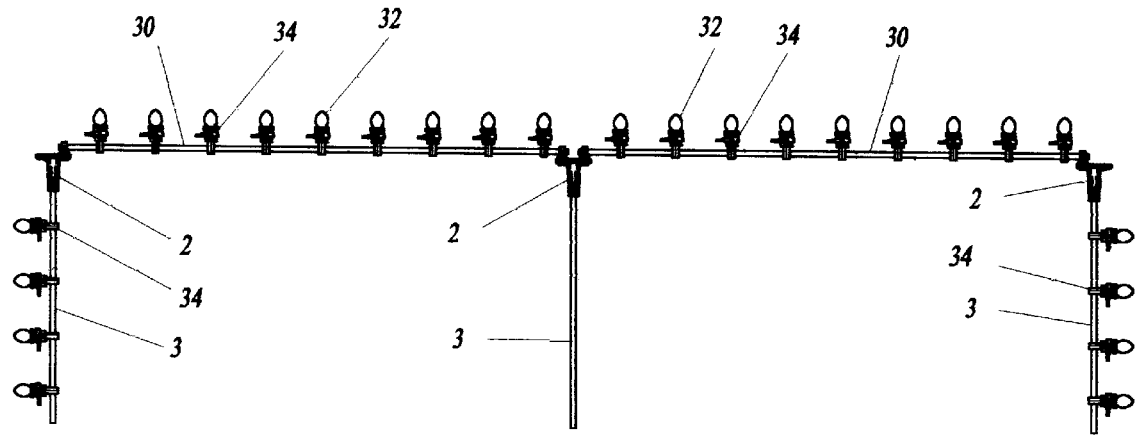
Fig. 11
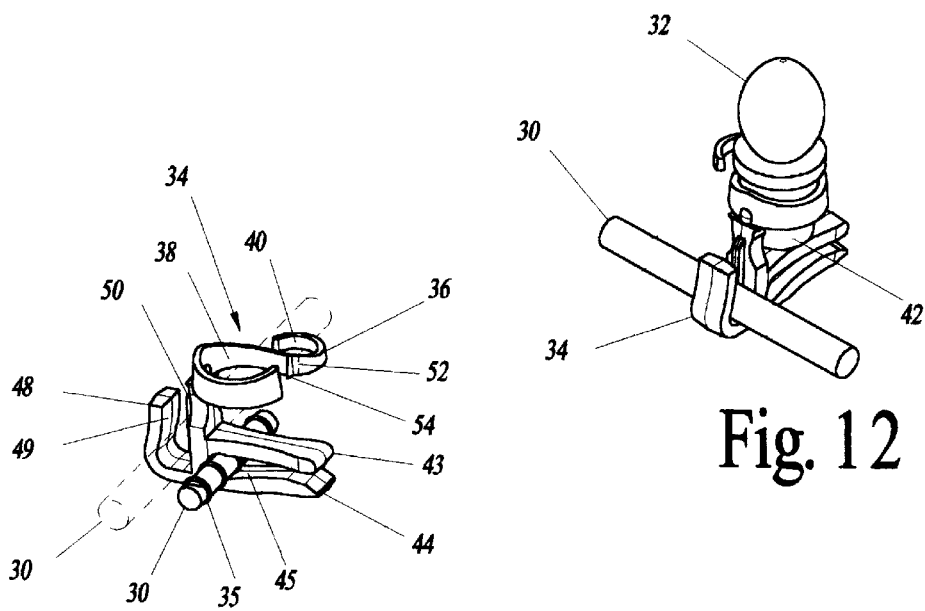
Fig. 12
Fig. 13

STAKE SYSTEM

FIELD OF THE INVENTION

This invention relates to stakes that can be driven into the ground and used with connectors to support strings of decorative lights or tall garden plants such as tomato plants.

DESCRIPTION OF THE PRIOR ART

The use of lights for decorating the exterior of a house is well known. Decorative lights typically consist of a large number of light sockets being wired together with light bulbs positioned in the light sockets. The "string" of decorative lights is then attached to the face of a building, to a fence or other structure. U.S. Pat. No. 5,667,174 discloses a plastic stake having an S-shaped light holder. A set of these stakes can hold a string of decorative lights by each S-shaped light holder gripping a light socket. Although this light stake allows the user to display decorative lights in a variety of places, the light string is held along generally straight lines at the same or nearly the same height from the ground. This stake can also be used to support growing plants by positioning the stem in the S-shaped holder or tying the stem to the stake. This use is limited by the height of the stake.

There are presently available a variety of decorations in which a wire or plastic frame is shaped like a recognizable object and decorative lights are attached to the frame. This type of lawn ornament can often be seen during the Christmas season in the form of reindeer, snowmen, Santa Claus and other seasonal shapes. Although many of these decorations are very attractive most of them are large and cannot be easily disassembled for storage. These decorations have pre-formed shapes that cannot be changed by the buyer.

Many people enjoy making Christmas decorations but do not have the time, talent or tools to construct lighted lawn ornaments. Hence, they either purchase pre-formed lawn ornaments, string lights on stakes like the one of U.S. Pat. No. 5,667,174, or do not have any lighted lawn ornaments. Thus, there is a need for a kit containing stakes and other components that would enable a consumer to construct lighted lawn ornaments easily and at a reasonable cost. The ornaments must not be adversely affected by cold temperatures and should be able to hold the lights during high winds which commonly accompany winter storms. The finished ornament should be easy to disassemble for storage after the holidays.

SUMMARY OF THE INVENTION

We provide a stake system for decorative lights that allows a person of average mechanical ability to create lighted lawn ornaments in an almost infinite variety of shapes and sizes. The stake system has a set of couplings and fiberglass rods and can be expanded to include bendable wire and light holders which fit onto the rods. The connector has a tubular body open at opposite ends and a transverse inner wall or collar between the opposite ends which with the inner wall of the body defines an open upper cavity and an open lower cavity. Each cavity is sized to receive one end of a rod. A pair of arms extend outwardly from opposite edges of one end of the tubular housing. Each arm has a slotted opening of sufficient diameter to permit a cord of a decorative light string to be inserted into and pass through the opening. Preferably the openings are of the same diameter as the cavities in the body of the coupling. Elbows, U-shaped rod holders, and moveable plate type rod holders are provided which have one end or post that fits into the coupling upper cavity. The elbows and U-shaped rod holders have a cavity or mouth sized to receive one end of a rod. A set of rods, elbows or rod holders and couplings can be connected together along a line or assembled to form a star or other shapes.

We also prefer to provide light holders which snap onto the rods. Each light holder preferably has an S-shaped portion that can grip a socket of a decorative light string. Alternatively, the light holder can be a C-shaped, flexible, gripping member that is able to retain all common size lights. The light holder can be provided with nodules which engage the light to more securely retain the light.

We may also provide bendable plastic or wire forms that are sized to fit into the elbows, upper cavity or opening in the coupling. The user can form a variety of shapes, attach lights to the formed shape and support the shape with the stake system.

Additional details, object and advantages of the invention will become more readily apparent as the following description of certain present preferred embodiments shown in the drawings proceeds.

BRIEF DESCRIPTION OF THE DRAWINGS

The drawings show presently preferred embodiments of our stake system in which:

FIG. 1 is a front view of a first presently preferred embodiment of our stake system used to support a plant with a single stake.

FIG. 2 is a perspective view of a present preferred coupling used in our stake system.

FIG. 3 is a sectional view taken along the line III—III of FIG. 2.

FIG. 4 is a top plan view of the coupling shown in FIG. 2.

FIG. 5 is a top plan view similar to FIG. 4 showing a second present preferred embodiment of the coupling.

FIG. 6 is a top plan view similar to FIG. 5 showing a third present preferred embodiment of the coupling.

FIG. 7 is an exploded view of the coupling of FIG. 2 with a present preferred elbow.

FIG. 8 is a front view of a the elbow shown in FIG. 7.

FIG. 11 is a front view of our stake system with horizontal rods holding decorative lights.

FIG. 12 is a front view of a present preferred light holder attached to a portion of the rod used in the embodiment of FIG. 10.

FIG. 13 is a perspective view of the light holder shown in FIG. 12.

Similar reference numerals are used to indicate similar parts in all figures of the drawings.

DETAILED DESCRIPTION OF THE PREFERRED EMBODIMENTS

Figure 15:
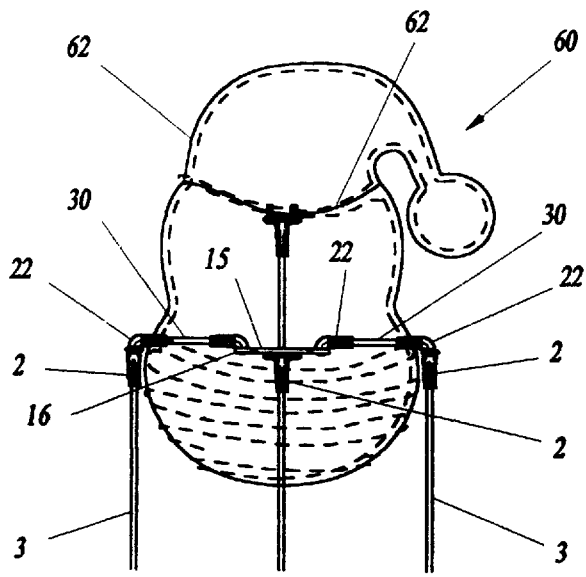
FIG. 15 is a front view of another embodiment of our stake system which includes bendable or preformed frame members assembled into a Santa Claus ornament.

Referring to FIGS. 1 through 4 our stake system 1 is comprised of a coupling shown in FIGS. 2 through 4 and a set of rods connected together with couplings. Two rods 3 connected to two couplings 2 are shown in FIG. 1. The lowest rod has been driven into the ground next to plant 5. A cloth or wire tie 6 runs from each coupling to encircle the stem of the plant and hold it in place. The rods preferably are round fiberglass rods 0.25" (7 mm) in diameter.

As shown in FIGS. 2, 3 and 4, the coupling has a tubular body 8 which is open at its upper end 7 and at its lower end 9. An interior wall or collar 12 defines upper cavity 10 and lower cavity 11. The inner wall 13 of the lower cavity and the inner wall 14 of the upper cavity are tapered to allow easy insertion of a rod 3 and provide a friction fit. Alternatively, a collar 19 or other projection may be provided on the rod 3 which snaps into groove 25 on the inner surface of the cavity as shown in chain line in FIG. 3. If desired, the rod and cavities may have a triangular, oval, square, octagonal or other non-circular cross-section to prevent rotation of the coupling relative to the rod. At the upper end 7 of the coupling we prefer to provide two arms 16 which extend outwardly opposite one another. Each arm has an opening 17 and slot 18. The slot allows a string, rope or cord 27 shown in chain line in FIG. 4 to pass through the openings 17. We further prefer to provide braces 20 for the arms as shown most clearly in FIGS. 2 and 7.

Figure 18:
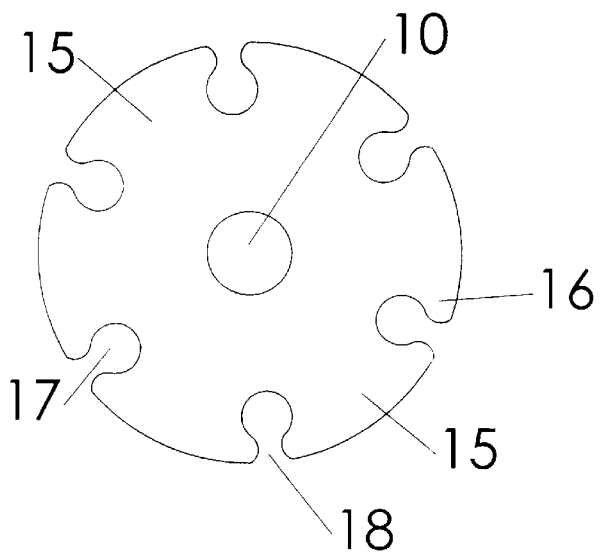
FIG. 18 is a top plan view, similar to FIGS. 4–6, of the coupling having bridge portions as shown in FIG. 15.

The coupling may be alternatively configured so that the arms 16 form an S-shape as shown in FIG. 5 or are flexible as shown in FIG. 6. In the embodiment of FIG. 6 the arms 16 have a ball 28 at the distal end which fits into mouth 29. In this configuration the arms function as built-in fasteners. If desired, bridge portions 15 may be provided between the arms 16 to give the upper end of the coupling a disc shape. Such a coupling is shown in FIGS. 15 and 18.

We further prefer to provide elbows 22 which have a split tubular portion 24 sized to fit within the upper cavity 10 of the coupling or the opening 17 defined by the arms 16. We further prefer to make the elbow to have a 90 degree turn with an opening 26 at its opposite end. The elbow 22 can also be tapered toward the opening 26 at the opposite end. Opening 26 is sized to receive rod 3. Although the elbow 22 is shown to turn 90 degrees, we further prefer to provide 45 degree elbows and 60 degree elbows. It may also be appropriate to provide a flexible elbow which would allow the user to bend the elbow.

Figure 9:
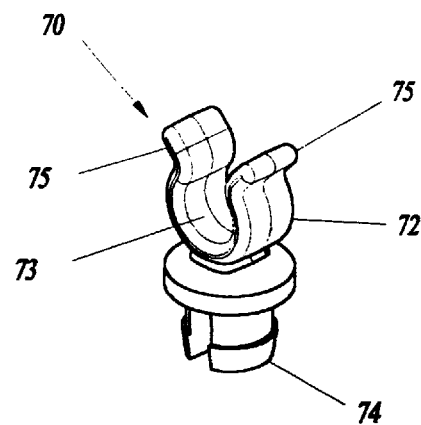
FIG. 9 is a perspective view of a rod holder that can be used with the coupling.

We also prefer to provide U-shaped rod holders 70 like that shown in FIG. 9. The rod holder has a U-shaped rod gripping member 72 which defines an opening or mouth 73 into which a rod is inserted. The rod gripping member is flexible and contoured so that the arms 75 will spread apart to permit insertion of the rod. A split tubular portion 74 is sized to fit within the upper cavity 10 of the coupling or the openings defined by the arms.

Figure 10:
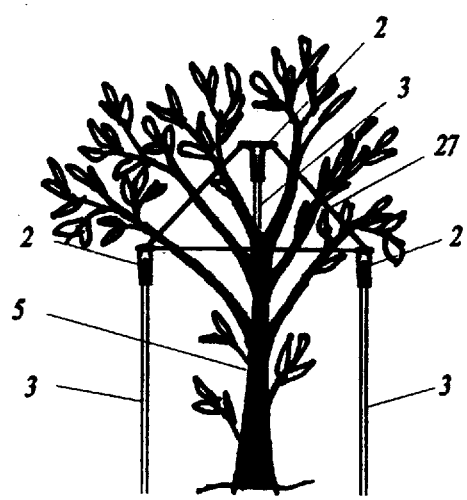
FIG. 10 is a perspective view of our stake system configured to support a plant using three stakes.

As can be seen in FIG. 10, the stake system can be configured to have three rods 3 with a coupling atop each rod. A string or cord 27 runs between the three couplings 2 to surround the plant 5. The string 27 can be tied to form a loop and then strung through the openings in the arms as shown by dotted lines 27 in FIG. 4.

Figure 20:
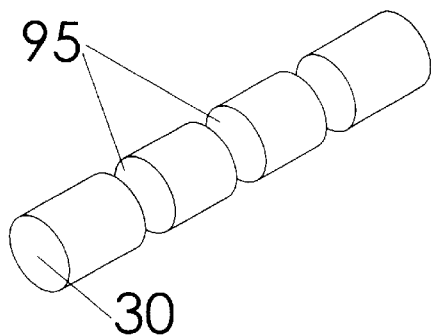
FIG. 20 is a perspective view similar to FIG. 19 showing another presently preferred embodiment of a rod having grooves.
Figure 19:
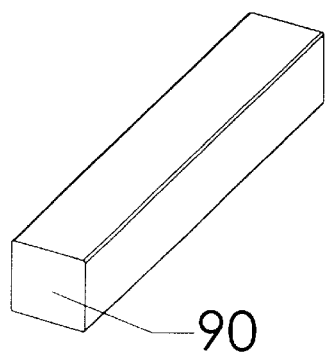
FIG. 19 is a perspective view of a presently preferred embodiment of a rod having a non-circular cross section.
Figure 21:
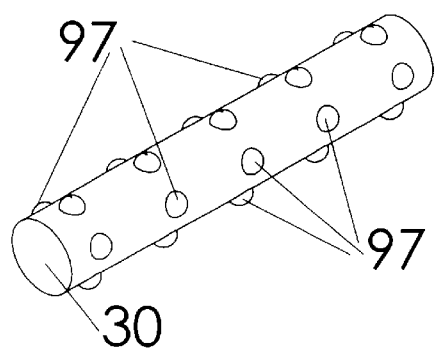
FIG. 21 is a perspective view similar to FIG. 20 showing a further presently preferred embodiment of a rod having surface deformations.

Referring to the embodiment of FIGS. 11, 12 and 13 we provide couplings 2 on a set of rods 3 that have been driven into the ground. We connect a horizontal rod 30 between each pair of adjacent couplings. The horizontal rods could be the same fiberglass rods as are used for the vertical rods 3, or they could be tubular, particularly vinyl tubing. Decorative lights 32 are attached to the horizontal rods. We also prefer to provide light holders 34 which snap onto the rods 30. The light holders can be placed anywhere along the length of the rod to accommodate spacing of lights on any chosen string of lights. The rods may have an oval, square or other out of round cross-section to prevent the lights from turning or twisting. Such a rod is shown in FIG. 19. The rods also could be threaded or have ridges 35 grooves 95, or other surface irregularities 97 to prevent or retard the light holders from sliding along the rod. Such rods are shown in FIG. 13, 20 and 21. Each light holder 34 preferably has a flexible, S-shaped portion 36 which forms a large opening 38 and a small opening 40 that can grip a socket 42 of a decorative light string. The large opening 38 is sized to hold the standard indoor C-4 size light bulb socket and the larger outdoor decorative light socket. The small opening 40 is sized to hold a mini light socket. The light holder 34 preferably has a pair of arms 43 and 44 which form a slot 45 into which the horizontal rod 30 can be inserted. The light holder 34 may also have an L-shaped rear leg 48 which forms slot 49. Rod 30 is inserted into the slot 49 and held in place by fin 50. Alternatively, the light holding portion can terminate at dotted line 52 to form a C-shaped, flexible, gripping member that is able to retain all common size lights. The light holder can be provided with nodules 54 which engage the light socket to more securely retain the decorative light. Although the rods 30 are shown held only by stakes, one could secure the rods to other structures such as a house, fence or window frame using any type of fastener including the removable fastener disclosed in U.S. Pat. No. D376,756 for suction cups.

Figure 14:
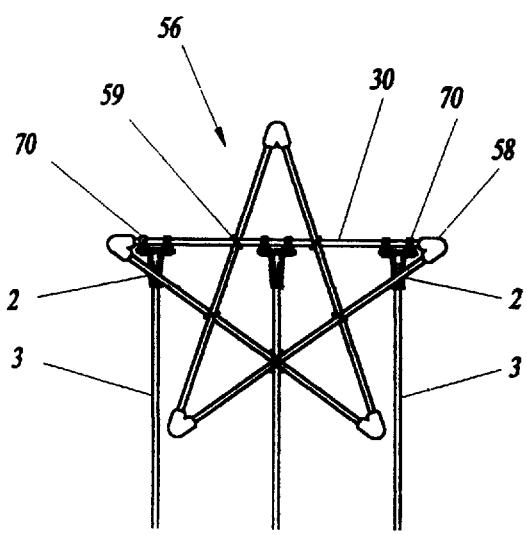
FIG. 14 is a front view of our stake system configured to create a star lawn ornament.

Our stake system can be used to create a star shaped lawn ornament 56 shown in FIG. 14. The star shape is formed by connecting five rods 30 together using elbows 58. Those elbows may be at a fixed angle or flexible. The star is held by three rods 3 and attached couplings 2 each connected to a rod 30. The rods may pass through an opening 17 defined by the arms 16 or be held in a rod holder 70. We also prefer to tie rods 30 together where they overlap using wire ties 59. Decorative lights (not shown) are then attached to the star shape.

We prefer to provide a supply of bendable wire or plastic rods 62 that can be connected using sleeve type couplings. This material can be bent into an infinite variety of shapes to form lawn ornaments. In the embodiment of FIG. 15 bendable wire 62 has been shaped to form the outline of a Santa Claus head 60. This form is supported by several rods 3 and 30, elbows 22 and couplings 2. Strings of decorative lights indicated by the dash and dot lines are attached to the frame.

Figure 16:
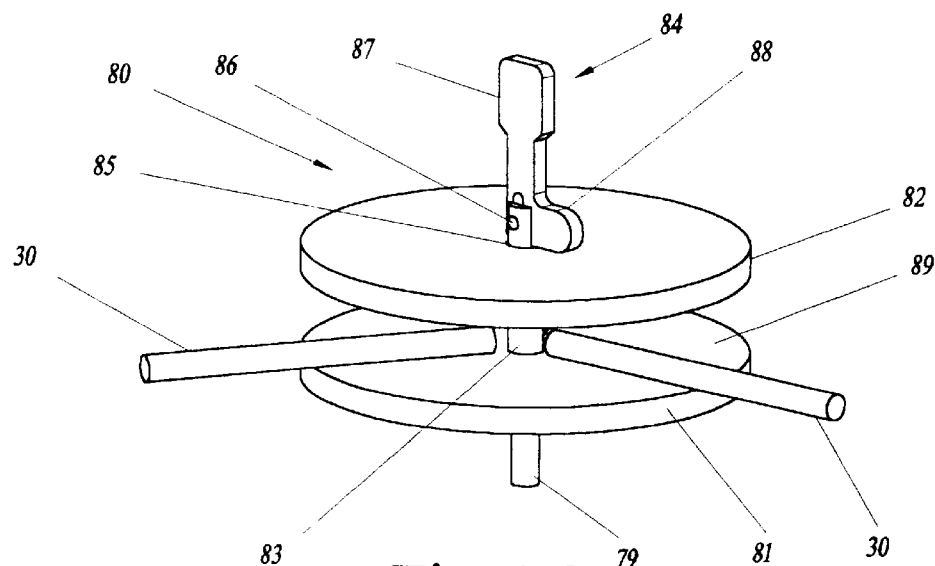
FIG. 16 is a perspective view of a moveable plate type rod holder in an open position.
Figure 17:
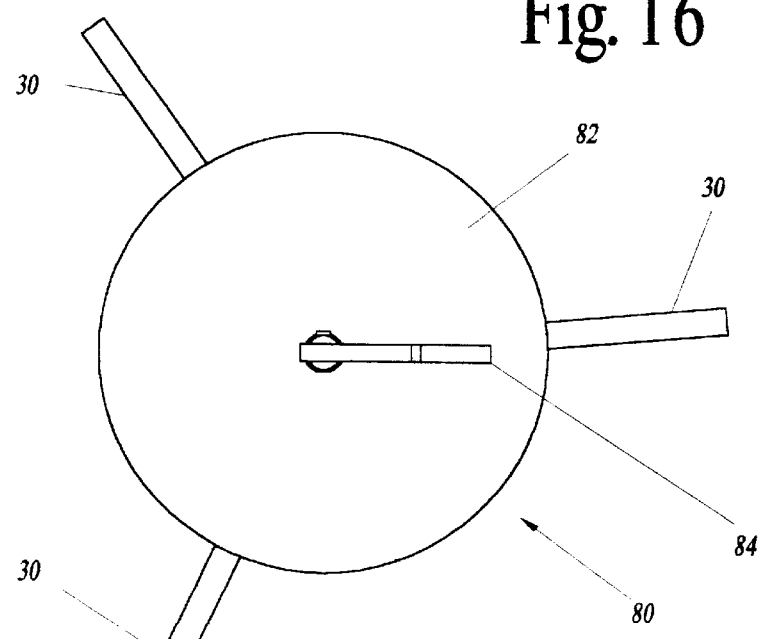
FIG. 17 is a top plan view of the moveable plate type rod holder shown in FIG. 16, but in a closed position.

For some decorative shapes it may be necessary to have several rods radiating from a central point like the spokes on a wheel. This can be done using the rod holder shown in FIGS. 16 and 17. This holder 80 has a base plate 81 with a post 83 extending from its center. A top plate 82 fits over the base plate 81 with the post 83 passing through a hole 85 in the center of the top plate 82. A slot is provided in the top of post 83 for receipt of cam lever 84. The lever 84 is attached to the post by pivot pin 86. When the handle 87 is moved downward about the pivot pin 86, cam 88 will push the top plate 82 toward the bottom plate 81. This pressure will enable the holder to grip rods 30 between the plates. As can be seen in FIG. 17 the rods can be positioned at any desired angle. If desired, the mating surfaces 89 of the plates may be roughened or have grooves or have a flexible surface such as a foam or soft rubber to increase the surface contact with the rods. A mounting post 79 extends from the bottom of the base plate and is sized to fit into the openings of the arms or the upper cavity.

The couplings and elbows and rod holders used in our stake system could be made of any metal, wood or plastic which will not break, melt or otherwise deteriorate when used outdoors. We prefer to use polypropylene or Lexan brand plastic. These plastics are easy to mold and can provide a clear or frosted appearance.

Although we have shown certain present preferred embodiments of our stake system it should be distinctly understood that our invention is not limited thereto but may be variously embodied within the scope of the following claims.

We claim:

1. A connector comprised of:
  a. a tubular body open at opposite ends and having a transverse inner wall between the opposite ends so that the tubular body and the inner wall define an open upper cavity and an open lower cavity each cavity sized to releasably receive one end of a rod;
  b. a pair of arms extending outwardly from opposite edges of one end of the tubular body, each arm having a slotted opening of sufficient diameter to permit a cord of a decorative light string to be inserted into and pass through the opening; and
  c. an elbow having a tubular portion at one end and an open cavity at an opposite end thereof sized to releasably receive one end of a rod, said tubular portion inserted into one of the openings in the arms and the upper cavity.

2. The connector of claim 1 wherein the elbow has an opening in an end opposite the inserted end which opening has a same diameter as the upper cavity.

3. The connector of claim 1 wherein the end of the elbow opposite the inserted end is tapered.

4. A stake system comprised of:
  a. a plurality of connectors, each connector having a tubular body open at opposite ends and having a transverse inner wall between the opposite ends so that the tubular body and the inner wall define an open upper cavity and an open lower cavity, each cavity sized to receive one end of a rod, and a pair of arms extending outwardly from opposite edges of one end of the tubular body each arm having a slotted opening of sufficient diameter to permit a cord of a decorative light string to be inserted into and pass through the opening;
  b. a plurality of rods each rod having one end inserted into the lower cavity of a respective one of said plurality of connectors;
  c. a plurality of elbows each elbow having one end inserted into one of the openings in the arms and the upper cavity of a respective one of said plurality of connectors and having an opening in an opposite end; and
  d. a plurality of transverse rods each transverse rod having one end inserted into an opening of a respective one of said plurality of elbows.

5. The stake system of claim 4 wherein the plurality of elbows and traverse rods form a recognizable decorative shape.

6. The stake system of claim 5 wherein the shape is a star.

7. A stake system comprised of
  a. a plurality of connectors each connector having a tubular body open at opposite ends and having a transverse inner wall between the opposite ends so that the tubular body and the inner wall define an open upper cavity and an open lower cavity each cavity sized to receive one end of a rod and a pair of arms extending outwardly from opposite edges of one end of the tubular housing each arm having a slotted opening of sufficient diameter to permit a cord of a decorative light string to be inserted into and pass through the opening;
  b. a plurality of rods each rod having one end inserted into the lower cavity of a respective one of said plurality of connectors;
  c. a plurality of elbows each elbow having one end inserted into one of the openings in the arms and the upper cavity of a respective one of said plurality of connectors and having an opening in an opposite end;
  d. a plurality of transverse rods each transverse rod having one end inserted into an opening of a respective one of said plurality of elbows; and
  e. a plurality of decorative light holders, each light holder attached to one of said plurality of transverse rods.

8. The stake system of claim 7 also comprising at least one decorative light string held by the plurality of decorative light holders.

9. A stake system comprised of
  a. a plurality of connectors, each connector having a tubular body open at opposite ends and having a transverse inner wall between the opposite ends so that the tubular body and the inner wall define an open upper cavity and an open lower cavity each cavity sized to receive one end of a rod and a pair of arms extending outwardly from opposite edges of one end of the tubular body each arm having a slotted opening of sufficient diameter to permit a cord of a decorative light string to be inserted into and pass through the opening;
  b. a plurality of rods each rod having one end inserted into the lower cavity of a respective one of said plurality of connectors; and
  c. at least one string of decorative lights having a cord which cord passes through the opening of at least one arm of at least one of said plurality of connectors.

10. A stake system comprised of:
  a. a plurality of connectors, each connector having a tubular body open at opposite ends and having a transverse inner wall between the opposite ends so that the tubular body and the inner wall define an open upper cavity and an open lower cavity, each cavity sized to receive one end of a rod, and a pair of arms extending outwardly from opposite edges of one end of the tubular body each arm having a slotted opening of sufficient diameter to permit a cord of a decorative light string to be inserted into and pass through the opening;
  b. a plurality of rods each rod having one end inserted into the lower cavity of a respective one of said plurality of connectors; and c. a plurality of rod holders each rod holder having an end inserted into one of the openings in the arms and the upper cavity of a respective one of said plurality of connectors and having a rod gripping portion having an opening into which an end of one of said plurality of rods is inserted.

11. The stake system of claim 10 wherein the rod gripping portion is U-shaped.

12. A stake system comprised of
   a. a plurality of connectors, each connector having a tubular body open at opposite ends and having a transverse inner wall between the opposite ends so that the tubular body and the inner wall define an open upper cavity and an open lower cavity each cavity sized to receive one end of a rod and a pair of arms extending outwardly from opposite edges of one end of the tubular body each arm having a slotted opening of sufficient diameter to permit a cord of a decorative light string to be inserted into and pass through the opening;
   b. a plurality of rods each rod having one end inserted into the lower cavity of a respective one of said plurality of connectors;
   c. a plurality of rod holders each rod holder having an end inserted into one of the openings in the arms and the upper cavity of one of said plurality of connectors and having a rod gripping portion having an opening into which an end of one of said plurality of rods is inserted; and
   d. the rod gripping portion is a pair of moveable plates.

13. A system for displaying decorative lights comprised of:
   a. a plurality of rods;
   b. a plurality of decorative light holders each comprised of:
      i. a pair of arms attached at one end and spaced apart at an opposite end to define an opening into which an end of a respective one of said plurality of rods is inserted; and
      ii. a light holder attached to the arms and having a flexible S-shaped or C-shaped portion which defines an opening sized to receive and grip a socket of a decorative light string; and
   c. a plurality of connectors attached to the plurality of rods, each connector sized and configured for attachment to a support structure, and each connector comprised of:
      i. a tubular body open at opposite ends and having a transverse inner wall between the opposite ends so that the tubular body and the inner wall define an open upper cavity and an open lower cavity each cavity sized to releasably receive one end of a rod such that a pair of rods are joined end to end.

14. The system of claim 13 wherein the rods have a non-circular transverse cross-section.

15. The system of claim 13 wherein at least one of the plurality of rods has surface deformations.

16. The system of claim 15 wherein the deformations are threads or grooves.

17. The system of claim 13 wherein the support structure is a plurality of support rods.

* * * * *